United States Patent [19]

Stanley

[11] Patent Number: 5,644,705
[45] Date of Patent: Jul. 1, 1997

[54] METHOD AND APPARATUS FOR ADDRESSING AND TESTING MORE THAN TWO ATA/IDE DISK DRIVE ASSEMBLIES USING AN ISA BUS

[75] Inventor: Thomas E. Stanley, Gilroy, Calif.

[73] Assignee: International Business Machines Corporation, Armonk, N.Y.

[21] Appl. No.: 643,078

[22] Filed: May 2, 1996

Related U.S. Application Data

[63] Continuation of Ser. No. 371,133, Jan. 11, 1995, abandoned.

[51] Int. Cl.$^6$ ........................................... G06F 11/00
[52] U.S. Cl. ................. 395/183.18; 395/427; 371/21.1; 304/239; 304/221.7; 304/238.4; 361/685
[58] Field of Search .................. 395/183.18, 183.01, 395/183.19, 183.2, 185.07, 427; 371/2.2, 21.1, 40.1; 364/221.7, 550, 238.4, 239; 361/685

[56] References Cited

U.S. PATENT DOCUMENTS

| | | | |
|---|---|---|---|
| 4,268,905 | 5/1981 | Johann et al. | 371/21.1 |
| 4,348,761 | 9/1982 | Berger | 371/21.1 |
| 4,641,207 | 2/1987 | Green et al. | 360/55 |
| 4,725,968 | 2/1988 | Baldwin et al. | 364/550 |
| 4,747,047 | 5/1988 | Coogan et al. | 364/200 |
| 4,885,683 | 12/1989 | Coogan | 371/16.1 |
| 4,888,549 | 12/1989 | Wilson et al. | 324/73 R |
| 4,949,036 | 8/1990 | Bezinque et al. | 324/212 |
| 4,967,155 | 10/1990 | Magnuson et al. | 324/212 |
| 5,239,445 | 8/1993 | Parks et al. | 361/729 |
| 5,295,247 | 3/1994 | Chang et al. | 395/325 |
| 5,313,585 | 5/1994 | Jeffries et al. | 395/275 |
| 5,313,626 | 5/1994 | Jones et al. | 395/575 |
| 5,361,346 | 11/1994 | Panesar et al. | 395/575 |
| 5,404,454 | 4/1995 | Parks | 395/275 |
| 5,530,960 | 6/1996 | Parks et al. | 395/825 |

FOREIGN PATENT DOCUMENTS 4-155670  5/1992  Japan.

*Primary Examiner*—Robert W. Beausoliel, Jr.
*Assistant Examiner*—Dieu-Minh Le
*Attorney, Agent, or Firm*—Merchant, Gould, Smith, Edell, Welter & Schmidt, P.A.

[57] ABSTRACT

A method and apparatus for addressing a plurality of AT Attachment, Integrated Drive Electronics (ATA/IDE) disk drive assemblies from a single PC/AT thereby allowing the performance of manufacturing tests on multiple IDE drives using the ISA bus. Other drive assemblies are address during the substantial PC/AT CPU and I/O idle time available during the testing of a selected drive assembly. The system includes a PC/AT computer having an ISA bus, a plurality of ATA/IDE disk drives, and a multi-master card disposed between the PC/AT and the plurality of disk drives. The multi-master card includes an IDE controller card with a parallel port. Signals are generated to select one of the plurality of disk drives and ISA bus signals are routed to the selected disk drives. All the disk drives are disabled but the selected disk drive and a three bit signal line is used to select the disk drive for testing. Test capabilities are provided for in a standard, local, and remote mode of operation. The addressing scheme allows all drives to be addressed as master drives and each master on the bus can have a slave attached.

20 Claims, 4 Drawing Sheets

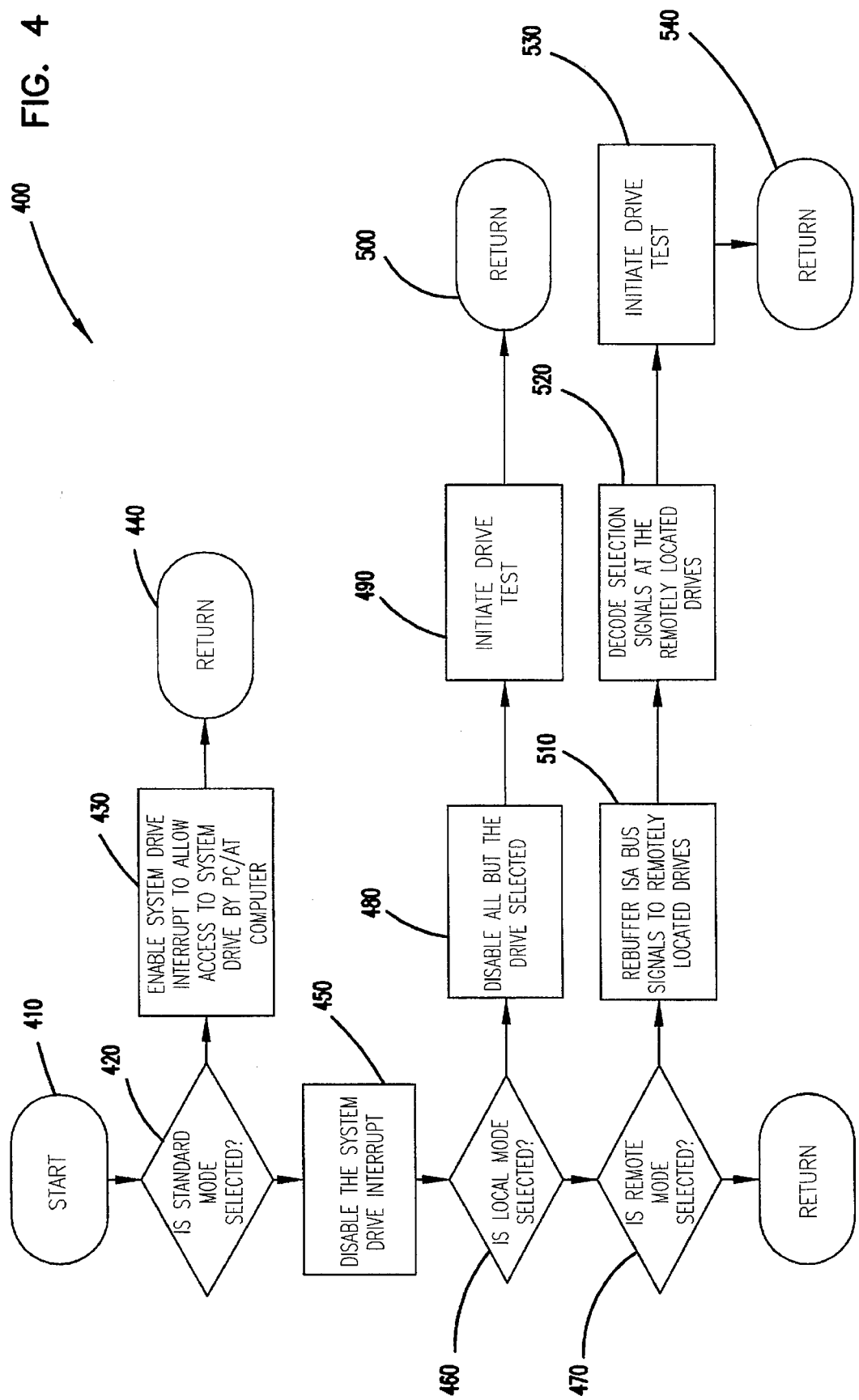

METHOD AND APPARATUS FOR ADDRESSING AND TESTING MORE THAN TWO ATA/IDE DISK DRIVE ASSEMBLIES USING AN ISA BUS

This is a Continuation of application Ser. No. 08/371,133 filed Jan. 11, 1995 now abandoned.

BACKGROUND OF THE INVENTION

1. Field of the Invention

This invention relates in general to a method and apparatus for addressing and testing multiple disk assemblies, and more particularly, to a method and apparatus for addressing a plurality of AT Attachment, Integrated Drive Electronics (ATA/IDE) drive assemblies from a single PC/AT.

2. Description of Related Art

It is desirable to test Integrated Drive Electronics (IDE) disk drives using the PC/AT Industry Standard Architecture (ISA) bus. This is the natural bus for the IDE disk drive and, therefore, the most effective way to evaluate disk drive performance. However, the standard AT Attachment (ATA) protocol of addressing IDE disk drives via the PC/AT limits the number of drives which may be addressed to two. Because of this limitation, a PC/AT mother board can test only two drives at a time. This poses cost problems for high volume testing of ATA/IDE drive assemblies in a manufacturing environment.

If the standard method of addressing ATA/IDE drive assemblies is used, then a PC/AT is required for every two drives under test. In order to support high volume production testing, a considerable capital investment would be consumed in PC/AT mother boards and the required hardware needed to support each mother board. This includes memory chips, add on cards, power supplies, and mounting hardware. Further, due to the high numbers of PC/AT based testers required, additional floor space and power requirements are directly affected.

Many approaches have been used for testing disk drives. For example, U.S. Pat. No. 4,725,968, issued Feb. 16, 1988, to Baldwin et al., entitled "DISK DRIVE TESTING METHOD AND APPARATUS", and incorporated herein by reference, discloses a disk drive testing apparatus which provides substantially automatic cycling through various tests of disk drive units. A graphical display is provided on a screen to the operator to allow the operator to determine whether the disk drive is performing in or out of specifications which may be read into the apparatus from an EEPROM memory module. The operator can cycle through a preselected series of tests on the drive unit. The tester is controlled by a microcomputer central processing unit to cycle through the tests and to provide a display on the screen for selected tests. The tester also provides an analysis of the probability of disk reading and writing errors and displays a graph illustrating the likelihood that data bit timing from the disk drive will remain within selected window margins over long periods of time. However, the ISA bus is not used and only one disk drive may be tested at any given time.

U.S. Pat. No. 4,438,761, issued Sep. 7, 1982, to James K. Berger, assigned to Pioneer Research, Inc., entitled "PORTABLE FIELD TEST UNIT FOR COMPUTER DATA AND PROGRAM STORAGE DISC DRIVE", and incorporated herein by reference, discloses a portable, programmable, microprocessor-controlled, universal field test unit capable of performing functional tests. The unit capable of carrying out special test programs, standard diagnostic programs, and formatting disc packs with many different formats. Individual instructions may be executed in the unit, or it may be run automatically under program control. Programs may be created by the actuation of the operation keys and numeric keys, or they may originate from a pre-programmed memory. However, the ISA bus is not used and only one disk drive may be tested at any given time.

U.S. Pat. No. 4,949,036, issued Aug. 14, 1990, to Bezinque et al., assigned to Seagate Technology, Inc., entitled "DISC DRIVE ERROR MAPPING USING THRESHOLD COMPARISON METHODS", and incorporated herein by reference, discloses an apparatus and method for testing a variety of hard disk drives which includes a computer connected to a control board and an interface board. The interface board is connected to a testing board. The hard disk drive is connected to the control board and testing board. The hard disk is tested by first erasing a track of data bits at full write current in one direction or polarity and second erasing the track at minimal write current in the opposite direction. The track is read and compared to a predetermined threshold and any level exceeding the threshold is considered defective. However, the ISA bus is not used and only one disk drive may be tested at any given time.

U.S. Pat. No. 5,361,346, issued Nov. 1, 1994, to Panesar et al., assigned to Santa Monica Pioneer Research, Inc., entitled "PORTABLE TESTER (QUALIFIER) FOR EVALUATING AND TESTING SCSI INTERFACE MAGNETIC DISC DRIVES IN ACCORDANCE WITH ANSI SCSI-A AND SCSI-2 DEFINITIONS", and incorporated herein by reference, discloses a programmable menu driven qualifier designed to test and evaluate direct access and sequential access SCSI devices. The testing is carried out in accordance with ANSI SCSI-1 and ANSI SCSI-2 definitions. A completely menu driven qualifier is used to execute all commands with a single keystroke of the keyboard. The qualifier uses a simple built-in concept which allows an operator quickly to become familiar with an SCSI protocol and command structure. Generally, the SCSI bus allows multiple CPUs to be coupled up to multiple disks. However, a SCSI controller card is required. Thus, ATA/IDE drive assemblies are not compatible.

Japanese Patent 4155670 invented by Nishizawa Shigenori, entitled "TESTING SYSTEM FOR SCSI DEVICE", and incorporated herein by reference, also discloses a device for testing SCSI disk drives. As mentioned above, a SCSI bus allows multiple CPUs to be coupled up to multiple disks, but a SCSI controller card is required and ATA/IDE drive assemblies are not compatible.

U.S. Pat. No. 4,641,207, issued Feb, 3, 1987, to Green et al., entitled "DIAGNOSTIC DEVICE AND METHOD FOR EXAMINING THE OPERATION OF A DISK DRIVE", and incorporated herein by reference, discloses an external diagnostic device for examining the operation of a disk drive. The device is coupled to input terminals and output terminals of the drive and operates in a selected one of several modes at a given time. However, the ISA bus is not used and only one disk drive may be tested at any given time.

U.S. Pat. No. 4,967,155, issued Oct. 30, 1990, to Vernon P. Magnuson, assigned to Micropolis Corporation, entitled "ENVIRONMENTALLY CONTROLLED MEDIA DEFECT DETECTION SYSTEM FOR WINCHESTER DISK DRIVES", and incorporated herein by reference, discloses an environmentally controlled media defect detection system for Winchester disk drives. The system includes a testing cabinet which is divided into two sections. The first section is maintained at an environmentally controlled elevated temperature for testing Winchester disk drives at elevated operational temperatures above ambient room temperatures. The second section is thermally insulated from the first section and contains a plurality of disk drive test units. One test unit is coupled to each Winchester disk drive being tested, and the test units have the ability to apply digital signals to the drive for writing and reading signals onto tracks of the drives, determining malfunctions, and imperfections in the disk media of the hard disk drive systems. Although multiple disk drives may be tested, the ISA bus is not utilized and thus multiple ATA/IDE drive assemblies may not be tested using a single PC/AT.

U.S. Pat. No. 4,888,549, issued Dec. 19, 1989, to Wilson et al., assigned to Wilson Laboratories, Inc., entitled "SYSTEM FOR TESTING INDIVIDUALLY A PLURALITY OF DISK DRIVE UNITS", and incorporated herein by reference, discloses a tester for storage peripheral devices. The tester comprises a test module which contains one or more ports. The storage peripheral device under test is placed into a carrier which is in turn inserted into the port. The carrier preferably includes a base comprised of a printed circuit board, a front panel, a frame and electronics and electronic connectors. The unit under test is connected to the base via the electronic connectors. The carrier is inserted into mating engagement with the test module. Environmental control is achieved by varying the amount of air flow through the test ports. Again, multiple disk drives may be tested, a means of using the ISA bus to test multiple ATA/IDE drive assemblies using a single PC/AT is not disclosed.

In addition to the shortcomings exhibited by the approaches discussed above, vendor IDE testers typically will test only a master or slave. For example, vendor IDE testers may use two parallel IDE channels which allows testing of two masters and two SLAVEs. However, this arrangement requires the use of a non-ISA bus. Other IDE testers have a single controller for each IDE drive under test. However, these also require the use of a non-ISA bus. Another method of testing disk drives buffers the PC/AT ISA bus out to a remote card which decodes the bus. A custom IDE controller then is used to communicate to the IDE drive. Further, if the MASTER/SLAVE addressing method is used, then the manufacturing operator is required to correctly set the option block jumper. This requires operator time and may result in errors in the setting of the option block which will degrade first pass test yield. Thus, the absence of a system that can address multiple ATA/IDE drive assemblies from a single PC/AT leads to a relatively high cost per test point.

Yet, the PC/AT CPU and I/O to each drive is idle much of the time since a substantial part of drive assembly testing is done via special code or self test. Thus, if only two drive assemblies are addressed, then PC/AT CPU utilization is very low. This CPU idle time could be used to initiate and test other drive assemblies.

It can seen then that there is a need for a disk drive tester that results in much lower per point cost for testing ATA/IDE drive assemblies.

It can also be seen that there is a need for a disk drive tester that can test multiple ATA/IDE disk drives using a single PC/AT computer.

Finally, it can also be seen that there is a need for an IDE disk drive tester which utilizes the substantial CPU and I/O idle time available during the testing of drive assemblies.

SUMMARY OF THE INVENTION

To overcome the limitations in the prior art described above, and to overcome other limitations that will become apparent upon reading and understanding the present specification, the present invention discloses a method and apparatus for addressing a plurality of AT Attachment Integrated Drive Electronics (ATA/IDE) drive assemblies from a single PC/AT.

The present invention solves the above-described problems by using the substantial PC/AT CPU and I/O idle time available during the testing of drive assemblies to initiate and address other drive assemblies.

A system in accordance with the principles of the present invention comprises a PC/AT computer having an ISA bus, a plurality of ATA/IDE disk drives, and a multi-master card disposed between the PC/AT computer and the plurality of disk drives. The multi-master card includes an IDE controller card with a parallel port, means for generating signals to select one of the plurality of disk drives, and means for accepting the output from the parallel port of the IDE controller card and routing portions of the output to selected disk drives.

One aspect of the present invention is that an interface is provided between an ISA bus and multiple ATA/IDE disk drives for allowing the performance of manufacturing tests on multiple IDE drives using the ISA bus on a single PC/AT computer.

Another aspect of the present invention is that all the disk drives are disabled except for the selected disk drive.

Another aspect of the present invention is that independent three bit signal lines are routed to each disk drive to provide selection control.

Still another aspect of the present invention is that test capabilities are provided for in a standard, local, and remote mode of operation.

Yet another aspect of the present invention is that an addressing scheme is used that allows all drives to be addressed as master drives.

Another aspect of the present invention is that each master on the multi-master bus can have a slave attached.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 4 is a flow chart of the operation of the system for addressing and testing multiple ATA disk drive assemblies.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a multi-master addressing scheme that takes advantage of certain aspects of the ATA Interface (ATA I/F)) standard. In particular, the ATA I/F standard requires a drive assembly's data bus to be set to a high impedance state when CS1FX- and CS3FX- are negated. This logically isolates a drive assembly's data bus from other drive assemblies on the ATA/IDE bus.

Figure 1:
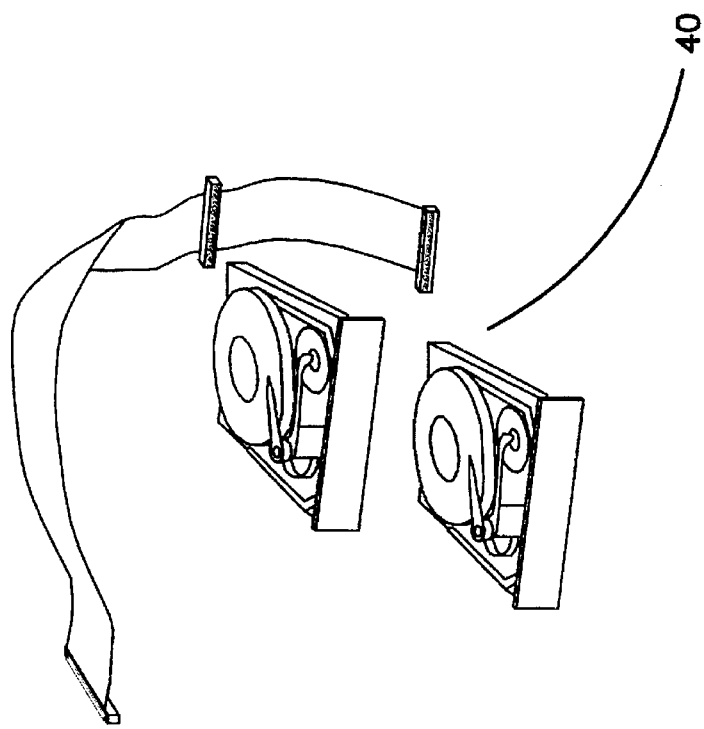
FIG. 1 is a diagram illustrating an IDE controller card and multi-master card which are inserted into a PC/AT computer to test multiple ATA disk drive assemblies.
Figure 1:
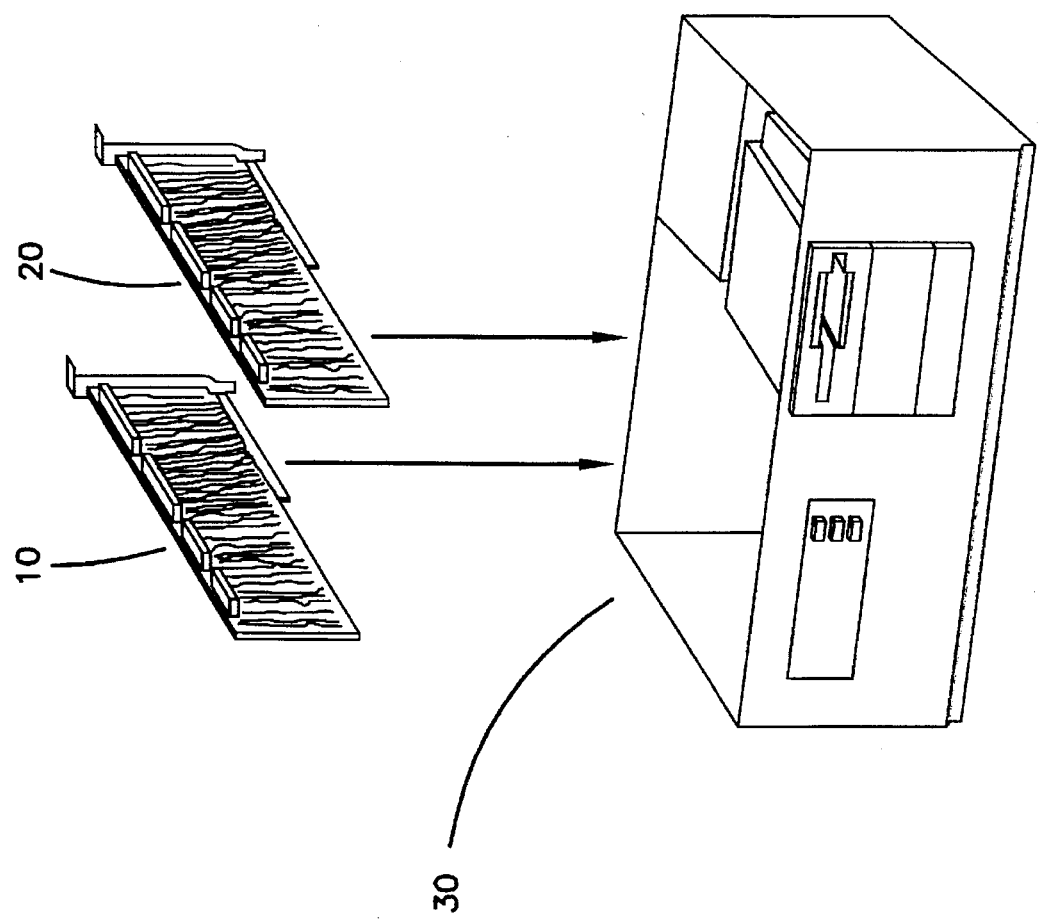

FIG. 1 is a diagram illustrating an IDE controller card 10 and multi-master card 20 which are inserted into a PC/AT computer 30 to test multiple ATA disk drive assemblies 40.

Figure 2:
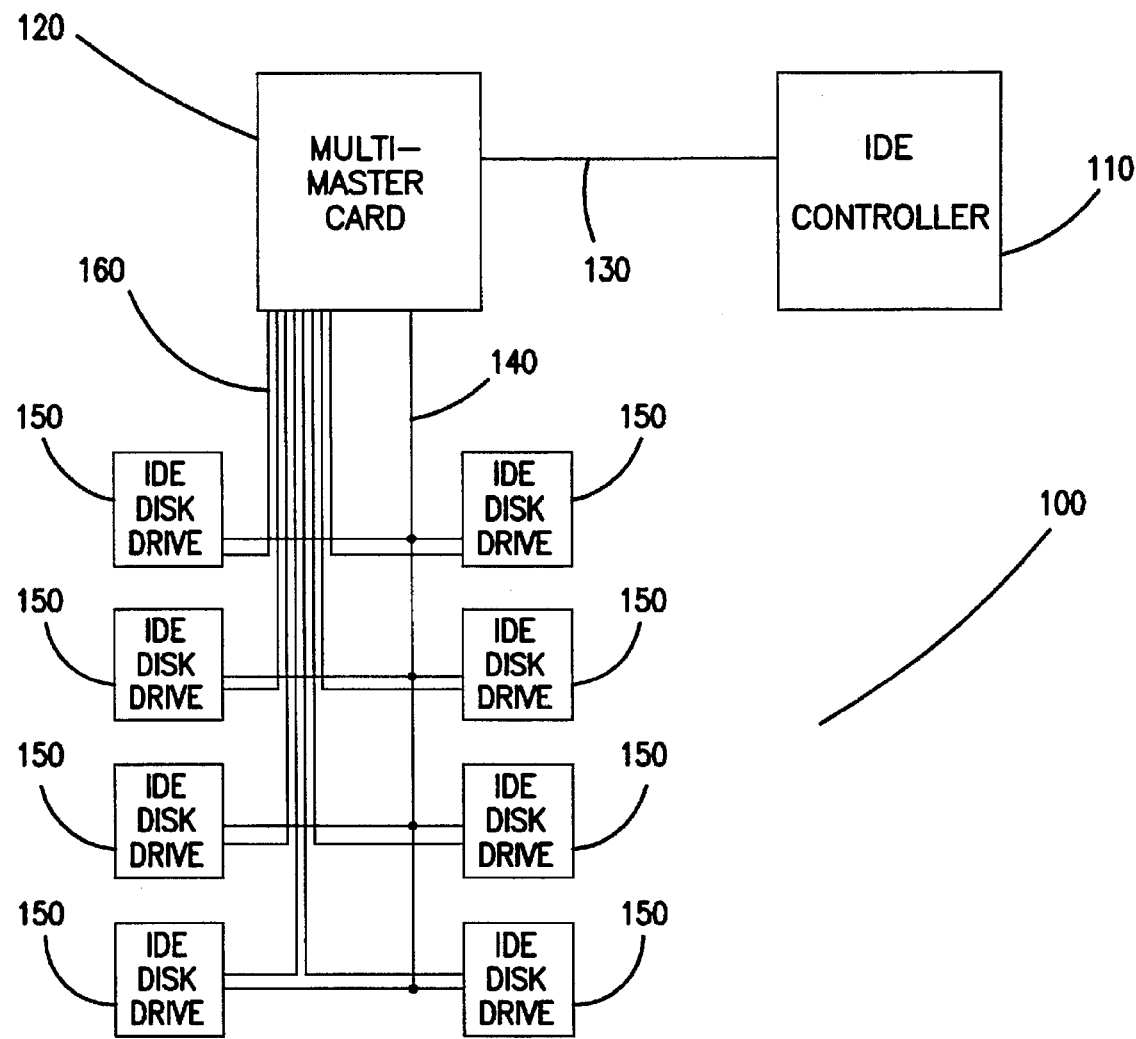
FIG. 2 is a block diagram of the system for addressing and testing multiple ATA disk drive assemblies.

FIG. 2 illustrates an exemplary system 100 according to the present invention. An IDE controller card provides test instructions and selection signals to a multi-master card 120 over a parallel signal path 130. A common bus 140 is connected to disk drives 150 that are to be tested. The common bus 140 provides the data and instructions for performing manufacturing tests to selected disk drives 150. Independent selection control is provided to each disk drive 150 via selection paths 160.

The multi-master card 120 allows a user to address a standard "C drive" for storage of test programs and test data on the PC/AT, as well as the ability to address a plurality of IDE disk drives 150 if the drive cables lengths do not exceed 18 inches or alternatively, IDE disk drives may be tested remotely via a remote mode.

As indicated above, implementation of multi-master addressing uses a commercially available IDE controller card 110 with a parallel port output that is connected into the multi-master card 120. The multi-master card 120 contains logic which will steer the ISA bus to the appropriate drive assembly 150. The parallel signal path 130 provides the necessary data input/data output (DI/DO) for drive assembly selection and selection verification. Thus, the multi-master card 120 accepts the ATA/IDE bus cable output from the IDE controller card 110 and routes all but the selection signals 160 (CS1FX- and CS3FX-) to all drive assemblies 150 on the ATA/IDE bus. Selection signals (CS1FX- and CS3FX-) 160 are routed separately to each drive assembly. All of the selection signal paths 160 are held at a negated state or logic low state except those that lead to the selected drive assembly.

Figure 3:
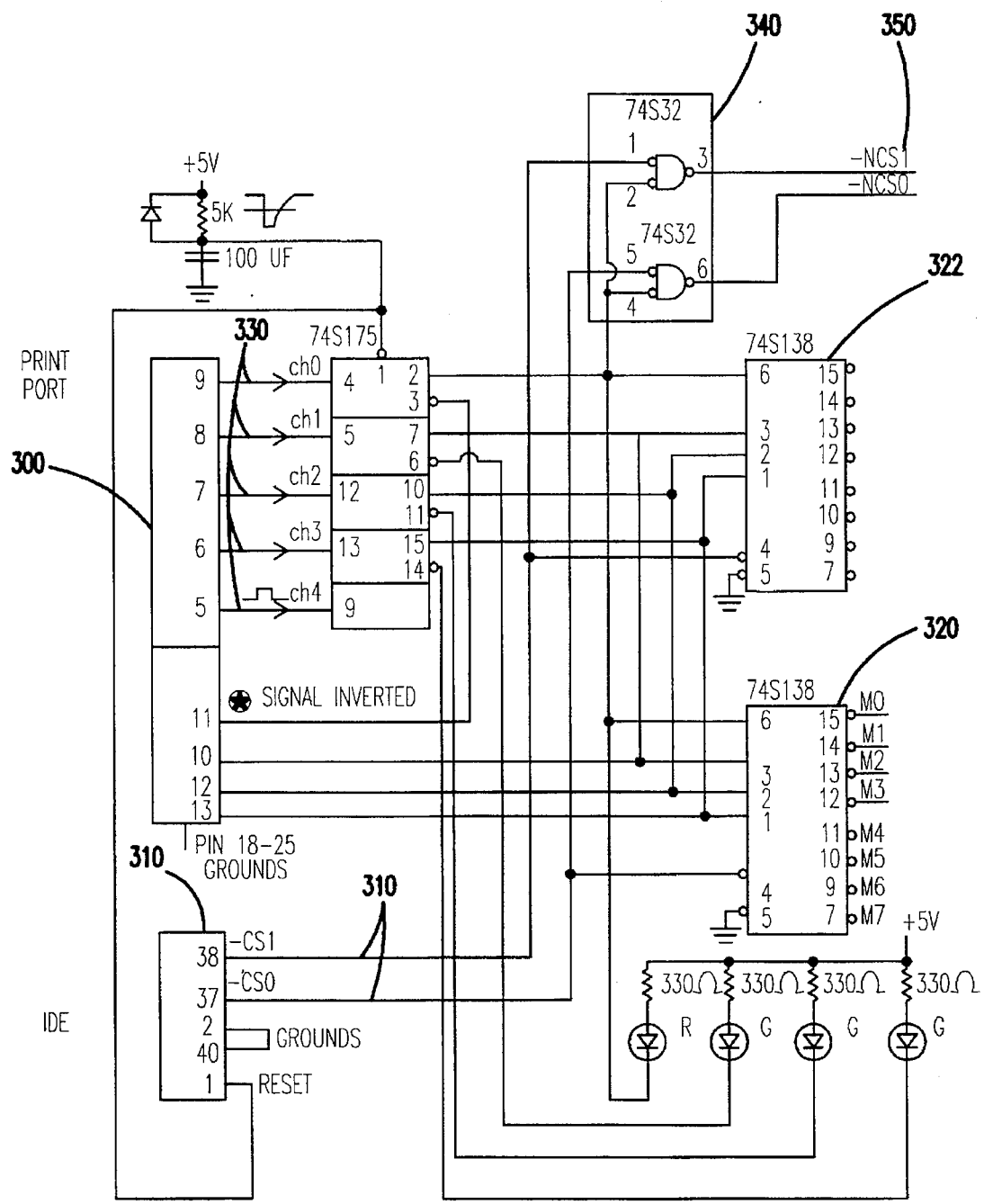
FIG. 3 is a circuit diagram of the encoder used in testing ATA/IDE disk drive assemblies according to the present invention.

FIG. 3 illustrates a block diagram of the encoder used in testing ATA/IDE disk drive assemblies according to the present invention. Signals from the parallel port 300 are used to multiplex the selection signals 310 to the selected disk drive. As discussed above, all of the other selection signals are held "low" and thus disable the corresponding disk drives. Multiplexors 320, 322 receive two selection signals 310 (CS1- and CS3-) from the IDE controller card. Using the signals 330 from the parallel port, the two selection signals 310 are routed to the appropriate disk drive. NAND gate 340 enables the user to switch to standard mode. Standard mode signals 350 (-NCS0 and -NCS1) enable the system drive which may be a C hard drive or a boot floppy drive. The modes of operation are discussed more fully below with reference to FIG. 4.

FIG. 4 is a flow chart 400 illustrating the modes of operation for the system for addressing and testing multiple ATA disk drive assemblies. The system begins 410 by deciding if standard mode 420 has been selected.

In the standard mode 420, the multi-master card may address an IDE disk drive with no switching of CS1FX- and CS3FX-. As mentioned, this is useful for addressing a normal C drive via BIOS. Standard mode is the default mode of the card at power up thereby allowing the system to be prepared for testing disk drive assemblies. To insure correct address selection the three bit address from the parallel port is wrapped back to a parallel input port for software comparison. To avoid conflicts between multiple drive interrupts and BIOS interrupt handlers, the disk drive interrupt to the PC/AT (IRQ14) is enabled 430 upon selection of the standard disk (C:drive). The system then may return 440 to select a multi-master drive. However, the system restores the drive interrupt 450 prior to selection of a multi-master drive.

As mentioned above, both LOCAL 460 and REMOTE 470 multi-master modes are available in addition to a standard mode operation 420. LOCAL multi-master mode 460 makes use of a multiplexor switch to steer CS1FX- and CS3FX- to the appropriate drive connector. All of the drives except for the one selected are disabled 480. Then the test is initiated 490 before returning to run other tests 500.

For disk drives that must be more than 18 inches from the IDE controller card, REMOTE multi-master mode 470 re-buffers 510 the ISA bus signals, including CS1FX- and CS3FX-, to the remote drives. A three bit select line is also buffered to the remote drives. Decoding of the select line at the remote plug point 520 enables CS1FX- and CS3FX- to the appropriate drive. Then the test is initiated 530 before returning to run other tests 540.

Since PC/AT BIOS is limited to addressing only two drives, software directly accesses the hard disk drive I/O ports 1F0H–1F7h (Task File registers) and 3F6h–3F7h (control block/registers). I/O ports are used to address parallel port 378h–379. This allows users to access the multiple IDE drive assemblies without the use of BIOS.

This addressing scheme is used to allow all drives to be addressed as master drives. Thus, each master on the multi-master bus can have a slave attached.

Because of the multi-master addressing scheme, all drives tested can be designated as multi-masters, thus alleviating the need for a manufacturing operator managing different drive configurations. Since the PC Memory Card International Association interface (PCMCIA I/F) is very similar to ATA/IDE, the multi-master may be used to test products using this interface. The multi-master scheme can also be utilized in adapting an ATA/IDE disk array or library system.

In summary, a method of addressing a plurality of AT Attachment Integrated Drive Electronics (ATA/IDE) drive assemblies from a single PC/AT has been developed, and demonstrated. Further, the present invention uses an addressing scheme that allows all drives to be addressed as master drives. Each master on the multi-master bus can have a slave attached.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An interface between an Industry Standard Architecture (ISA) bus and more than two AT Attachment, Integrated Device Electronics (ATA/IDE) disk drives for allowing the execution of manufacturing tests by a host CPU on the more than two IDE drives using the ISA bus, the interface comprising:

an IDE disk drive controller for receiving control signals from the host CPU and providing test instructions for the more than two IDE disk drives;

a multi-master encoder, coupled to the IDE disk drive controller, the encoder receiving the test instructions from the IDE disk drive controller and receiving selection signals from the CPU, the encoder further including a common output port for providing data and test instructions to the more than two IDE disk drives and independent control port for providing individual drive selection signals to each of the more than two IDE disk drives from disabling all but one of the disk drives:

a common input/output (I/O) path, coupled to the common output port and the more than two IDE disk drives, for routing the data and test instructions from the encoder to the more than two IDE drives; and independent signal paths, coupled to the independent control port and the more than two IDE disk drives, for individually routing the drive selection signals from the encoder to the multiple IDE drives for disabling all but one of the disk drives such that one of the more than two IDE disk drives is selected for testing, wherein each of the more than two IDE disk drives operates as a master.

2. The interface of claim 1 wherein the independent signal paths further comprises a three bit signal line.

3. The interface of claim 1 further comprising mode selection means for selecting a mode of operation for the interface such that test functionality in a standard local, and remote mode of operation is provided.

4. The interface of claim 3 wherein the standard mode of operation causes the encoder to disable the more than two IDE disk drives and allows the CPU to address a C drive coupled to the host CPU.

5. The interface of claim 4 wherein the CPU communicates with the system disk drive using a Basic Input Output System (BIOS) program contained on a mother board of the host CPU.

6. The interface of claim 4 wherein the standard mode of operation is selected by default at power-up of the CPU.

7. The interface of claim 1 wherein the encodeer further comprises a multiplexor for receiving the selection signals and generating individual selection signal to one of the more than two disk drives selected for testing.

8. The interface of claim 3 wherein the remote mode of operation enables the re-buffering of the data and test instructions and the individual selection signals.

9. An apparatus for testing multiple AT Attachment Integrated Device Electronics (ATA/IDE) disk drives through an Industry Standard Architecture (ISA) bus, comprising:

a computer having an ISA bus;

more than two ATA/IDE disk drives, each disk drive operating as a master; and an IDE disk drive controller for receiving control signals from the host CPU and providing test instructions for the more than two IDE disk drives;

a multi-master encoder, coupled to the IDE disk drive controller, the encoder receiving the test instructions from the IDE disk drive controller and receiving selection signals from the CPU, the encoder further including a common output port for providing data and test instructions to the more than two IDE disk drives and independent control port for providing individual drive selection signals to each of the more than two IDE disk drives for disabling all but one of the disk drives;

a common input/output (I/O) path, coupled to the common output port and the more than two IDE disk drives, for routing the data and test instructions from the encoder to the more than two IDE drives; and independent signal paths, coupled to the independent control port and the more than two IDE disk drives, for individually routing the drive selection signals from the encoder to the multiple IDE drives for disabling all but one of the disk drives such that one of the more than two IDE disk drives is selected for testing, wherein each of the more than two IDE disk drives operates as a master.

10. The interface of claim 9 wherein the independent signal paths further comprises a three bit signal line.

11. The apparatus of claim 9 further comprising mode selection means for selecting a mode of operation for the interface such that test functionality in a standard, local, and remote mode of operation is provided.

12. The apparatus of claim 11 wherein the standard mode of operation causes the encoder to disable the more than two IDE disk drives and allows the CPU to address a C drive coupled to the host CPU.

13. The apparatus of claim 12 wherein the computer communicates with the system disk drive using a Basic Input Output System (BIOS) program contained on a mother board of the computer.

14. The apparatus of claim 12 wherein the standard mode of operation is selected by default at power-up of the computer.

15. The apparatus of claim 11 wherein the encoder further comprises a multiplexor for receiving the selection signals and generating individual selection signals to one of the more than two disk drives selected for testing.

16. The apparatus of claim 11 wherein the remote mode of operation enables re-buffering of the output from the multi-master encoder to drives located remotely from the computer.

17. A method of testing more than two AT Attachment Integrated Device Electronics (ATA/IDE) disk drives through an Industry Standard Architecture (ISA) bus, each disk drive operating as a master, the method comprising the steps of:

converting test instructions from an IDE disk drive controller for the more than two IDE disk drives using a multi-master encoder coupled to the IDE disk drive controller;

receiving selection signals from the CPU for selecting one of the IDE disk drives;

providing data and test instructions to the more than two IDE disk drives; and providing individual drive selection signals to each of the more than two IDE disk drives for disabling all of the more than two IDE disk drives except for the selected IDE disk drive.

18. The method of claim 17 further comprising the step of selecting a mode of operation, the mode of operation comprising a standard, local, or remote mode of operation.

19. The method of claim 18 wherein the step of selecting the standard mode of operation further comprises disabling the more than two ATA/IDE disk drives and allowing the CPU to address a system disk drive.

20. The method of claim 18 wherein the step of selecting the remote mode of operation further comprises the steps of enabling the rebuffering of the data and test instructions and the individual selection signals.

* * * * *